(12) United States Patent
Ma

(10) Patent No.: US 11,923,554 B2
(45) Date of Patent: Mar. 5, 2024

(54) EXTRUDED HOLLOW PLATE, BATTERY BOX BOTTOM PLATE, BATTERY CASING, AND ELECTRIC VEHICLE

(71) Applicant: Yi Ma, Nanjing (CN)

(72) Inventor: Yi Ma, Nanjing (CN)

( * ) Notice: Subject to any disclaimer, the term of this patent is extended or adjusted under 35 U.S.C. 154(b) by 370 days.

(21) Appl. No.: 17/295,053

(22) PCT Filed: Oct. 17, 2019

(86) PCT No.: PCT/CN2019/111779
§ 371 (c)(1),
(2) Date: May 19, 2021

(87) PCT Pub. No.: WO2020/103617
PCT Pub. Date: May 28, 2020

(65) Prior Publication Data
US 2022/0013837 A1    Jan. 13, 2022

(30) Foreign Application Priority Data

Nov. 20, 2018   (CN) .......................... 201811382454.4

(51) Int. Cl.
*H01M 50/207* (2021.01)
*H01M 50/247* (2021.01)
*H01M 50/249* (2021.01)

(52) U.S. Cl.
CPC ....... *H01M 50/207* (2021.01); *H01M 50/247* (2021.01); *H01M 50/249* (2021.01); *H01M 2220/20* (2013.01)

(58) Field of Classification Search
None
See application file for complete search history.

(56) References Cited

FOREIGN PATENT DOCUMENTS

CN          103241112       *    8/2013

OTHER PUBLICATIONS

Machine translation of CN103241112 (Year: 2013).*

* cited by examiner

*Primary Examiner* — Wyatt P McConnell
(74) *Attorney, Agent, or Firm* — PROI Intellectual Property US; Klaus Michael Schmid

(57) ABSTRACT

An extruded hollow plate and an electric vehicle battery casing formed by combining the extruded hollow plates. The extruded hollow plate has a plate-shaped body having a constant cross-section, a cavity is provided inside the plate-shaped body, a protrusion and/or a groove is provided at an end of the body, the protrusion is bent downward, the groove opens upwards as a hook, and the arc surfaces forming the protrusion and the groove each comprise at least two involute surfaces. Compared with the existing battery box manufacturing process of friction stir welding, the combining and bonding connection manner has the significant advantages of rapid production speed, a low device cost, high flatness, etc.

6 Claims, 4 Drawing Sheets

EXTRUDED HOLLOW PLATE, BATTERY BOX BOTTOM PLATE, BATTERY CASING, AND ELECTRIC VEHICLE

TECHNICAL FIELD

The present invention relates to automobile parts, and specifically, to an extruded hollow plate, a battery box bottom plate, a battery shell, and an electrical automobile.

BACKGROUND

A power battery system used in an electrical automobile mainly includes a battery module, a battery shell, a pipeline, and a circuit system. The power battery system serves as a key part, and security, reliability, and durability of the power battery system decide the performance of the whole automobile. Currently, the most common manner of arranging a power battery is to hang a battery lower-shell onto the bottom of an automobile body. As a carrier of a power battery, a battery shell not only has extremely high dimensional accuracy requirements, but also needs to have sufficient protection capabilities to meet physical protection requirements of a battery under traveling conditions of an automobile.

The battery shell not only needs to accommodate enough batteries to meet battery life requirements, where the weight of a battery pack generally reaches 600 kg or more, but also needs to have sufficient protection performance, including vibration resistance performance, impact resistance performance, crash safety performance, stone crash resistance performance, sealing performance (IP67), anti-corrosion performance, and light-weighting.

Upon retrieval, Chinese patent document CN107732062A discloses an aluminum alloy battery lower-shell of a new energy automobile and a preparation method therefor. Four rectangular extruded hollow-plate profiles are spliced into a bottom plate, where an extruded hollow plate has a thickness of about 10 mm, a width of 35 to 38 mm, and a length of 2000 mm. The four hollow-plate profiles are arranged along the length direction of the bottom plate and are abutted to form three seams. Since front and back faces of the seams are all welded through friction stir welding, there are six long weld seams, and the total length of the weld seams reaches 12 meters. However, the speed of the friction stir welding is only about 1.3 m/min, it takes 9 to 10 minutes to only complete the weld seams, and in consideration of clamping, more time is taken. It can be seen that in the entire manufacturing process of a battery shell, fixation of the seams occupies too much working time, which has become a bottleneck restricting the speed of a battery shell manufacturing streamline.

Based on rich practical experience and professional knowledge in designing and manufacturing such products for years in combination with application of the DFMA idea, the designer actively researches and innovates, and expects to create a battery box bottom plate of a novel structure, and after continuous researching and designing, and repeated trials and improvements, the designer finally creates the present invention with a practical value.

SUMMARY OF THE INVENTION

Objective of the Invention: To overcome shortcomings in the prior art, the present invention provides a spliced and bonded battery bottom plate structure of a novel structure.

Technical Solution: To resolve the foregoing technical problems, the present invention provides an extruded hollow plate, including a plate-shaped body having a constant cross section, the plate-shaped body includes a cavity inside, the body includes a protrusion and/or a groove at end portions or at an end portion, the protrusion bends downward, the groove forms an upward hook at an opening thereof, the protrusion includes a first curved surface, a first transitional surface, and a third curved surface, the groove includes a second curved surface, a second transitional surface, and a fourth curved surface, and the first curved surface, the second curved surface, the third curved surface, and the fourth curved surface include at least two involute surfaces; and when two extruded hollow plates are spliced, a protrusion of one of the extruded hollow plates is rotated with a lower-surface seam as a center and inserted into a groove of the other extruded hollow plate, in the rotation and insertion process, a first gap is kept between the first curved surface and the second curved surface, and a second gap is kept between the third curved surface and the fourth curved surface, and when the first transitional surface overlaps the second transitional surface, the two hollow plates are located in the same plane.

Preferably, there is a recess between the first curved surface and the end portion of the body, and there is a downward hook between the second curved surface and the end portion of the body; when the two extruded hollow plates are spliced, the downward hook is squeezed into the recess for providing reverse locking, so that before a structural adhesive completely solidifies, seams is protected from easily slidably opening along a splicing direction when being subjected to a lifting force.

Preferably, the cavity includes a longitudinal separator inside, where there may be one or more longitudinal separators to produce a structure reinforcing effect similar to that of reinforcing ribs in a wing.

Preferably, the first gap includes a first bonding layer having a thickness of 0.1 to 0.2 mm inside, and the second gap includes a wedge-shaped second bonding layer inside. Based on differences in stress conditions, the two bonding layers are achieved by using adhesive overflowing gaps of different shapes in structural design. In addition, due to the existence of the gaps, in a splicing/assembly process, the structural adhesive inside the groove may not be scratched out by the protrusion that is rotated into the groove, and instead, is approximately evenly squeezed, so that the structural adhesive is evenly spread in the gap to form a firm bonding layer/joint interface.

Preferably, the groove includes, at the opening thereof, a deformation portion used for connecting the protrusion in a pressed manner, where the opening of the groove is pre-designed with a specific amount of opening deformation, and after the protrusion is spliced/mounted, the deformation portion is squeezed by external pressure to contract, and the two hollow plates at both ends of the seam achieve a better locking effect.

Preferably, the plate-shaped body further includes a seal groove at the end portion thereof, and a seal strip is embedded in the seal groove. The seal strip is used as a second waterproof guarantee, which is achieved by elastic sealing of pre-processing a shape of the seal groove and embedding the seal strip, thereby improving the waterproof performance of the battery box bottom plate.

The present invention further provides a battery box bottom plate, formed by splicing extruded hollow plates, where: the extruded hollow plate includes a plate-shaped body having a constant cross section, the plate-shaped body includes a cavity inside, the body includes a protrusion and/or a groove at end portions or at an end portion, the protrusion bends downward, the groove forms an upward hook at an opening thereof, the protrusion includes a first curved surface, a first transitional surface, and a third curved surface, the groove includes a second curved surface, a second transitional surface, and a fourth curved surface, and the first curved surface, the second curved surface, the third curved surface, and the fourth curved surface include at least two involute surfaces; and when two extruded hollow plates are spliced, a structural adhesive is applied to a surface of a groove of one of the extruded hollow plates, and a protrusion of the other extruded hollow plate is rotated with a lower-surface seam as a center and inserted into the groove; in the rotation and insertion process, a first gap is kept between the first curved surface and the second curved surface, and a second gap is kept between the third curved surface and the fourth curved surface; when the first transitional surface overlaps the second transitional surface, the two hollow plates are flush with each other at an upper-surface seam; and a first bonding layer of 0.1 to 0.2 mm is evenly applied into the first gap, and a wedge-shaped second bonding layer is formed inside the second gap.

The present invention further describes use of the foregoing battery box bottom plate in a battery shell, which is fixedly connecting the battery box bottom plate to side plates.

A method for manufacturing the battery box bottom plate of an electrical automobile is to reliably connect the foregoing extruded hollow plates in a splicing and bonding manner, where: first, a structural adhesive is applied to a surface of a groove of one of the extruded hollow plates; then, a protrusion of the other extruded hollow plate is rotated with a lower-surface seam as a center and inserted into the groove, where in the rotation and insertion process, a first gap of 0.1 to 0.2 mm is kept between the first curved surface and the second curved surface, and a first bonding layer is evenly applied into the first gap; a second gap is kept between the third curved surface and the fourth curved surface, and a wedge-shaped bonding layer is formed inside the second gap; finally, when the two extruded hollow plates are leveled at an upper-surface seam to complete splicing, the first transitional surface overlaps the second transitional surface, and the splicing and bonding is completed after waiting for the structural adhesive to solidify.

An electrical automobile using the foregoing battery shell also falls within the scope of the present invention.

Beneficial Effects: In the present invention, a bent nose-type self-locking connection structure is used at end portions of the extruded hollow plates, representing the following significant progresses:

1. A splicing-and-bonding connection manner is significantly superior to the existing friction-stir-welding connection manner in terms of a production speed.

2. Actions of splicing and bonding are simple. The first plate is placed horizontally, the second plate is moved along an arc, mounted at a groove of the first plate, and pushed inward, and by analogy, the third plate is mounted at a groove of the second plate. There are only movements in two degrees of freedom, that is, rotating and pushing. A structure of a manufacturing device is greatly simplified, which greatly reduces device costs compared with friction stir welding.

3. An aluminum alloy profile having a constant cross section can be achieved through an existing mature aluminum alloy extrusion process, and based on an existing process for molding an extruded hollow plate, can be manufactured by changing only extrusion dies, leading to extremely low switching costs.

4. Heating is not needed in the entire assembly process, which prevents a large-area bottom plate from undergoing uncertain thermal deformation during a welding process, thereby reducing working time and device occupation required for leveling.

In addition to the foregoing technical problems resolved by the present invention, the technical features forming technical solutions, and advantages brought by the technical features of the technical solutions, to make objectives, the technical solutions, and advantages of the present invention more clear, other technical problems that the present invention can resolve, other technical features included in the technical solutions, and advantages brought by the technical features are described below more clearly and completely with reference to the accompanying drawings in the embodiments of the present invention. Apparently, the described embodiments are merely some rather than all of the embodiments of the present invention. Generally, components of the embodiments of the present invention described and shown in the accompanying drawings may be arranged and designed in various different configurations. Therefore, the following detailed description of the embodiments of the present invention provided in the accompanying drawings is not intended to limit the scope of the claimed invention, but merely represents selected embodiments of the present invention. All other embodiments derived by a person of ordinary skill in the art from the embodiments of the present invention without creative efforts shall fall within the protection scope of the present invention.

Figure 1:
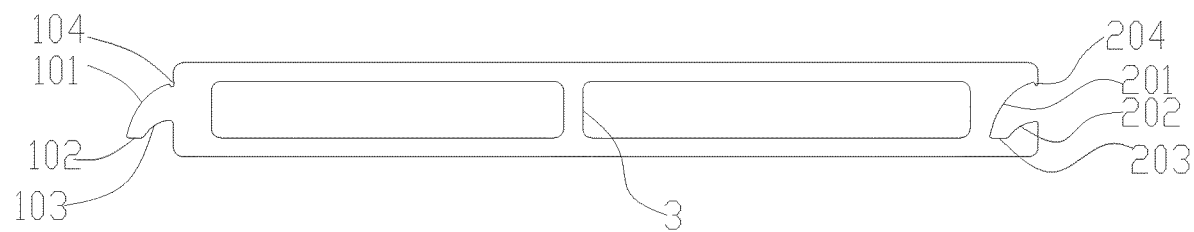
FIG. 1 is a cross-sectional view of an extruded hollow plate according to Embodiment 1 of the present invention.
Figure 2:
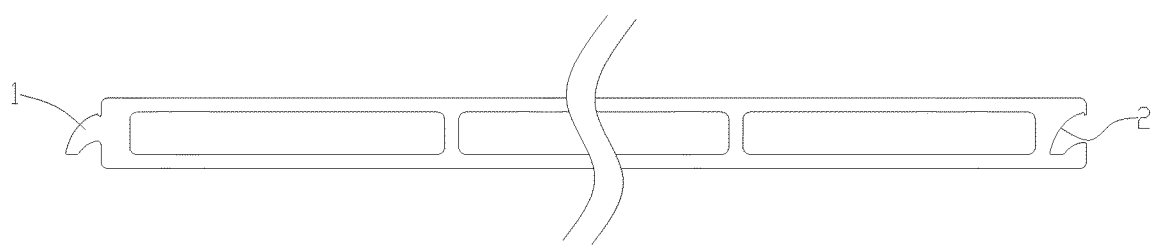
FIG. 2 is a schematic structural diagram according to Embodiment 2 of the present invention.
Figure 3:
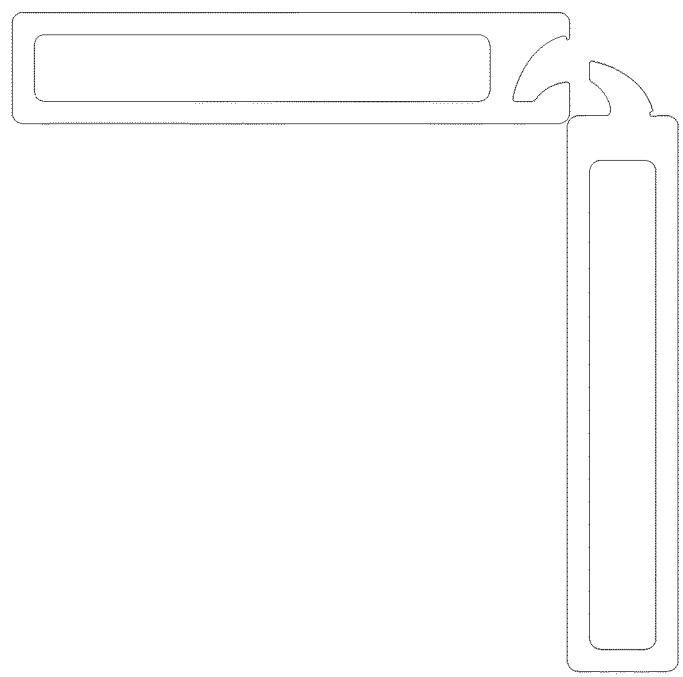
FIG. 3 is a state diagram of a splicing process 1 according to Embodiment 3 of the present invention.
Figure 4:
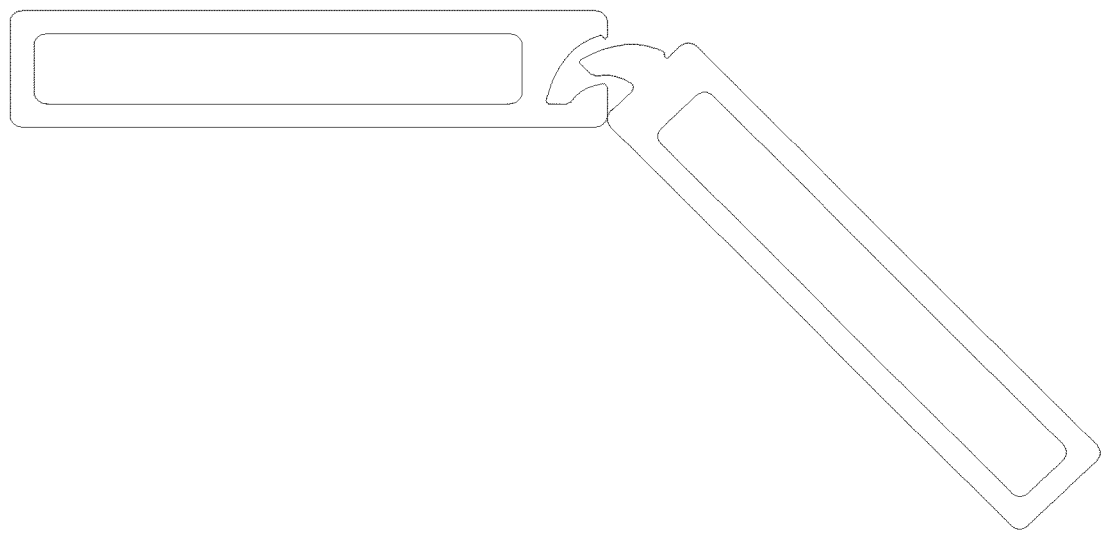
FIG. 4 is a state diagram of a splicing process 2 according to Embodiment 3 of the present invention.
Figure 5:
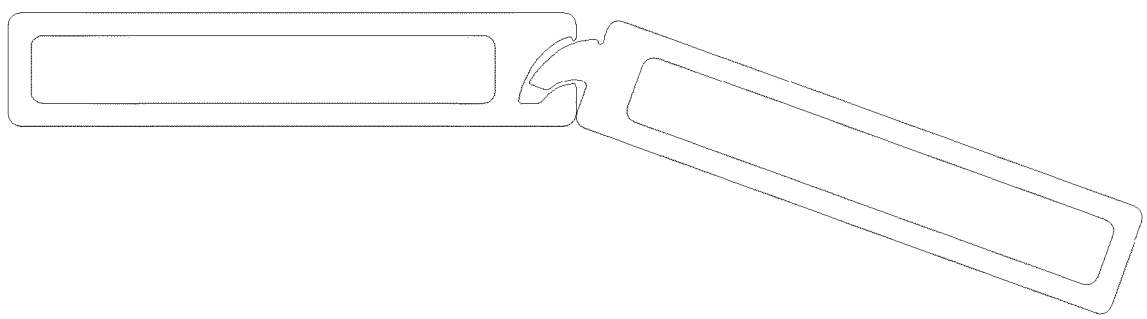
FIG. 5 is a state diagram of a splicing process 3 according to Embodiment 3 of the present invention.
Figure 6:
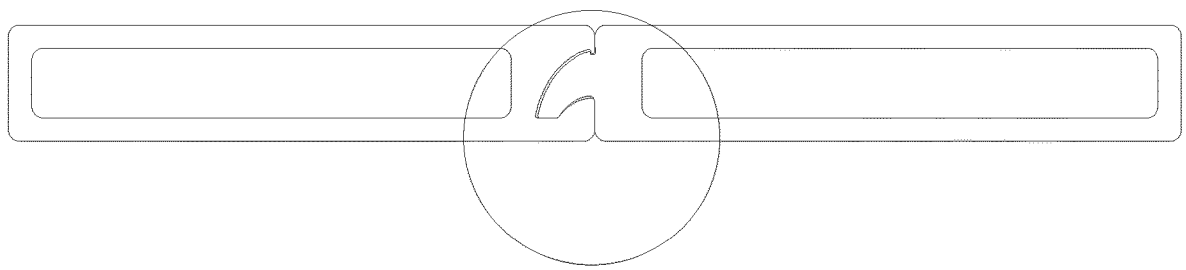
FIG. 6 is a state diagram of completion of splicing according to Embodiment 3 of the present invention.

In the figures: protrusion 1, first curved surface 101, first transitional surface 102, third curved surface 103, recess 104, groove 2, second curved surface 201, second transitional surface 202, fourth curved surface 203, downward hook 204, longitudinal separator 3, first bonding layer 4, second bonding layer 5.

DETAILED DESCRIPTION OF THE EMBODIMENTS

Embodiment 1

An extruded hollow plate of this embodiment is shown in FIG. 1. A plate-shaped body is a structure having a constant cross section, and includes a cavity inside. The body includes a protrusion 1 and a groove 2 at end portions thereof. The protrusion 1 bends downward by a negative angle, and the groove 2 forms a corresponding upward hook at an opening thereof. The protrusion 1 is formed by a first curved surface 101, a first transitional surface 102, and a third curved surface 103. The groove 2 is formed by a second curved surface 201, a second transitional surface 202, and a fourth curved surface 203. At least two of the first curved surface 101, the second curved surface 201, the third curved surface 103, and the fourth curved surface 203 are involute surfaces. A recess 104 is provided between a top portion of the protrusion 1 and the end portion of the body, and a downward hook 204 is provided at a top portion of the groove 2, for providing locking in a direction opposite to a splicing direction.

Embodiment 2

This embodiment is a variant of Embodiment 1. There may be one or more longitudinal separators to produce a structure reinforcing effect similar to that of reinforcing ribs in a wing.

Embodiment 3

This embodiment is used to describe a process of splicing two extruded hollow plates. According to an assembly sequence shown in FIG. 3, FIG. 4, FIG. 5, and FIG. 6, first, a structural adhesive is applied to a surface of a groove of one of the extruded hollow plates. Then, a protrusion of the other extruded hollow plate is rotated with a lower-surface seam as a center and inserted into the groove, where in the rotation and insertion process, a first gap of 0.1 to 0.2 mm is kept between the first curved surface and the second curved surface, and a first bonding layer is evenly applied into the first gap. A second gap is kept between the third curved surface and the fourth curved surface, and a wedge-shaped bonding layer is formed inside the second gap. Finally, the two extruded hollow plates are leveled at an upper-surface seam, where the first transitional surface overlaps the second transitional surface, and the splicing and bonding is completed after waiting for the structural adhesive to solidify.

Figure 7:
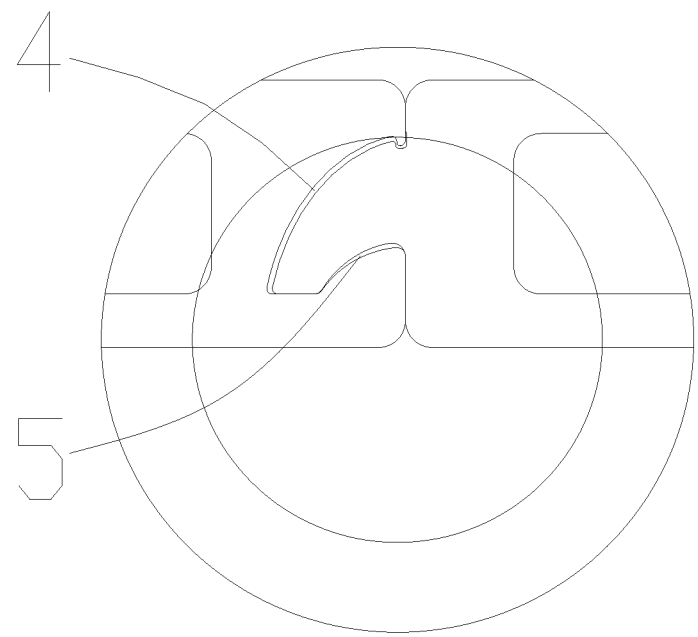
FIG. 7 is a partial enlarged diagram of FIG. 6.
Figure 8:
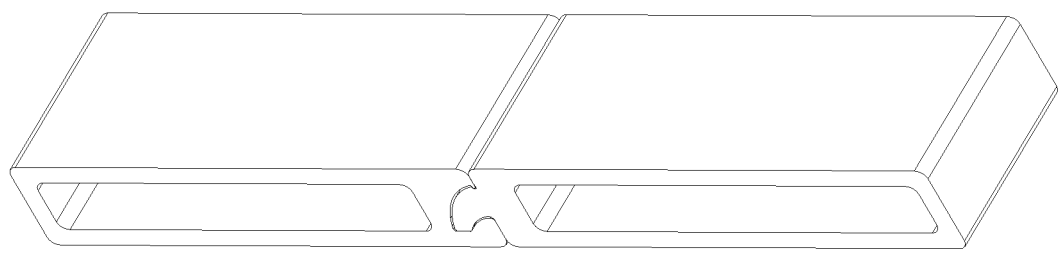
FIG. 8 is an axonometric diagram of FIG. 6.
Figure 9:
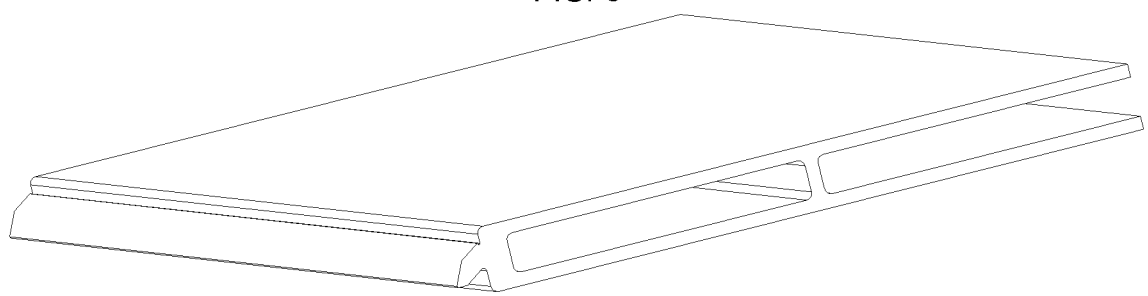
FIG. 9 is a schematic diagram of a protrusion portion in FIG. 8.
Figure 10:
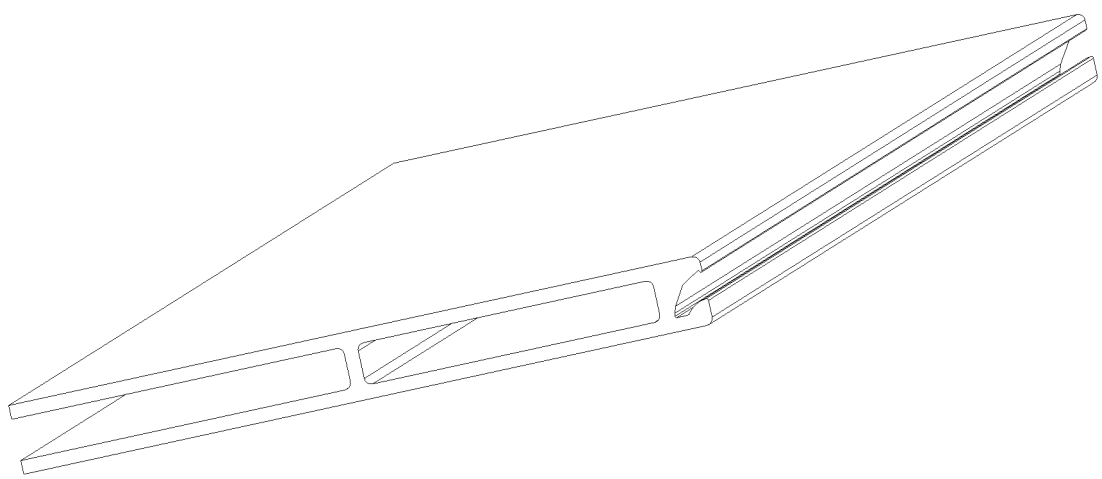
FIG. 10 is a schematic diagram of a groove portion in FIG. 8.

As shown in FIG. 7 and FIG. 8, the first gap includes a first bonding layer 4 having a thickness of 0.1 to 0.2 mm inside, and the second gap includes a wedge-shaped second bonding layer 5 inside. The protrusion portion in FIG. 9 and the groove portion in FIG. 10 both are continuous structures having a constant cross section. Correspondingly, the bonding layers also become continuous structures. The two bonding layers are provided with specific shapes through structural design, to not only meet requirements of stress conditions during use and become references for each other during splicing, but also are provided with adhesive overflowing gaps. In addition, due to the existence of the gaps, in a splicing/assembly process, the structural adhesive inside the groove may not be scratched out by the protrusion that is rotated into the groove, and instead, is approximately evenly squeezed, so that the structural adhesive is evenly spread in the gap to form a firm bonding layer/joint interface.

A deformation portion used for connecting the protrusion in a pressed manner may also be designed at the opening of the groove, where the opening of the groove is pre-designed with a specific amount of opening deformation, and after the protrusion is spliced/mounted, the deformation portion is squeezed by external pressure to contract, and the two hollow plates at both ends of the seam achieve a better locking effect.

Alternatively, a seal groove may be designed at the end portion of the plate-shaped body, and a seal strip is embedded in the seal groove. As a second waterproof guarantee, continuous elastic sealing of a long seam can be guaranteed more easily by pre-processing the shape of the seal groove and embedding the seal strip into the seal groove, so that a leakage point caused by possible uneven application of the adhesive to the long seam can be avoided, thereby improving the waterproof performance of the battery box bottom plate.

The invention claimed is:

1. An extruded hollow plate, comprising a plate-shaped body having a constant cross section, wherein: the plate-shaped body comprises a cavity inside, the body comprises a protrusion and/or a groove at end portions or at an end portion, the protrusion bends downward, the groove forms an upward hook at an opening thereof, the protrusion comprises a first curved surface, a first transitional surface, and a third curved surface, the groove comprises a second curved surface, a second transitional surface, and a fourth curved surface, and the first curved surface, the second curved surface, the third curved surface, and the fourth curved surface comprise at least two involute surfaces;
   when two extruded hollow plates are spliced, a protrusion of one of the extruded hollow plates is rotated with a lower-surface seam as a center and inserted into a groove of the other extruded hollow plate, in the rotation and insertion process, a first gap is kept between the first curved surface and the second curved surface, and a second gap is kept between the third curved surface and the fourth curved surface; when the first transitional surface overlaps the second transitional surface, the two hollow plates are located in the same plane; the second gap is wedge-shaped, and when the protrusion is rotated into the groove, a structural adhesive coated on a joint interface is evenly squeezed by the wedge-shaped gap that the structural adhesive gradually enters, and finally, an evenly spread bonding layer is formed inside the wedge-shaped gap; and
   the protrusion comprises a recess at a root portion thereof and between the first curved surface and the end portion of the body, and the groove comprises a downward hook at a top portion thereof and between the second curved surface and the end portion of the body; when the two extruded hollow plates are spliced, the downward hook is squeezed into the recess for providing reverse locking; and the groove comprises, at the opening thereof, a deformation portion used for connecting the protrusion in a pressed manner, and after the protrusion is mounted into the groove, the deformation portion is squeezed by an external force to contract.

2. The extruded hollow plate according to claim 1, wherein the cavity comprises a longitudinal separator inside.

3. The extruded hollow plate according to claim 1, wherein the first gap comprises a first bonding layer having a thickness of 0.1 to 0.2 mm inside, and the second gap comprises a wedge-shaped second bonding layer inside.

4. The extruded hollow plate according to claim 1, wherein the plate-shaped body further comprises a seal groove at the end portion thereof, and a seal strip is embedded in the seal groove.

5. A battery box bottom plate, formed by splicing extruded hollow plates, wherein:

the extruded hollow plate comprises a plate-shaped body having a constant cross section, the plate-shaped body comprises a cavity inside, the body comprises a protrusion and/or a groove at end portions or at an end portion, the protrusion bends downward, the groove forms an upward hook at an opening thereof, the protrusion comprises a first curved surface, a first transitional surface, and a third curved surface, the groove comprises a second curved surface, a second transitional surface, and a fourth curved surface, and the first curved surface, the second curved surface, the third curved surface, and the fourth curved surface comprise at least two involute surfaces;

when two extruded hollow plates are spliced, a structural adhesive is applied to a surface of a groove of one of the extruded hollow plates, and a protrusion of the other extruded hollow plate is rotated with a lower-surface seam as a center and inserted into the groove; in the rotation and insertion process, a first gap is kept between the first curved surface and the second curved surface, and a second gap is kept between the third curved surface and the fourth curved surface; when the first transitional surface overlaps the second transitional surface, the two hollow plates are flush with each other at an upper-surface seam; a first bonding layer of 0.1 to 0.2 mm is evenly applied into the first gap, and a wedge-shaped second bonding layer is formed inside the second gap; the second gap is wedge-shaped, and when the protrusion is rotated into the groove, the structural adhesive coated on a joint interface is evenly squeezed by the wedge-shaped gap that the structural adhesive gradually enters, and finally, an evenly spread bonding layer is formed inside the wedge-shaped gap; and the protrusion comprises a recess at a root portion thereof and between the first curved surface and the end portion of the body, and the groove comprises a downward hook at a top portion thereof and between the second curved surface and the end portion of the body; when the two extruded hollow plates are spliced, the downward hook is squeezed into the recess for providing reverse locking; and the groove comprises, at the opening thereof, a deformation portion used for connecting the protrusion in a pressed manner, and after the protrusion is mounted into the groove, the deformation portion is squeezed by an external force to contract.

6. A battery shell, formed by side plates and a bottom plate, wherein: the bottom plate is formed by splicing extruded hollow plates, the extruded hollow plate comprises a plate-shaped body having a constant cross section, the plate-shaped body comprises a cavity inside, the body comprises a protrusion and/or a groove at end portions or at an end portion, the protrusion bends downward, the groove forms an upward hook at an opening thereof, the protrusion comprises a first curved surface, a first transitional surface, and a third curved surface, the groove comprises a second curved surface, a second transitional surface, and a fourth curved surface, and the first curved surface, the second curved surface, the third curved surface, and the fourth curved surface comprise at least two involute surfaces;

when two extruded hollow plates are spliced, a structural adhesive is applied to a surface of a groove of one of the extruded hollow plates, and a protrusion of the other extruded hollow plate is rotated with a lower-surface seam as a center and inserted into the groove; in the rotation and insertion process, a first gap is kept between the first curved surface and the second curved surface, and a second gap is kept between the third curved surface and the fourth curved surface; when the first transitional surface overlaps the second transitional surface, the two hollow plates are flush with each other at an upper-surface seam; a first bonding layer of 0.1 to 0.2 mm is evenly applied into the first gap, and a wedge-shaped second bonding layer is formed inside the second gap; the second gap is wedge-shaped, and when the protrusion is rotated into the groove, the structural adhesive coated on a joint interface is evenly squeezed by the wedge-shaped gap that the structural adhesive gradually enters, and finally, an evenly spread bonding layer is formed inside the wedge-shaped gap; and the protrusion comprises a recess at a root portion thereof and between the first curved surface and the end portion of the body, and the groove comprises a downward hook at a top portion thereof and between the second curved surface and the end portion of the body; when the two extruded hollow plates are spliced, the downward hook is squeezed into the recess for providing reverse locking; and the groove comprises, at the opening thereof, a deformation portion used for connecting the protrusion in a pressed manner, and after the protrusion is mounted into the groove, the deformation portion is squeezed by an external force to contract.

\* \* \* \* \*